US008269859B2

(12) United States Patent
Taoka

(10) Patent No.: US 8,269,859 B2
(45) Date of Patent: Sep. 18, 2012

(54) PHOTOGRAPHING APPARATUS THAT PERFORMS DISTORTION CORRECTION IN ASSOCIATION WITH DIGITAL AND OPTICAL ZOOM, METHOD OF CONTROLLING THE SAME, AND RECORDING MEDIUM HAVING RECORDED THEREON COMPUTER PROGRAM TO IMPLEMENT THE METHOD

(75) Inventor: Mineki Taoka, Yokohama (JP)

(73) Assignee: Samsung Electronics Co., Ltd., Suwon-Si (KR)

( * ) Notice: Subject to any disclaimer, the term of this patent is extended or adjusted under 35 U.S.C. 154(b) by 303 days.

(21) Appl. No.: 12/561,382

(22) Filed: Sep. 17, 2009

(65) Prior Publication Data

US 2010/0097481 A1 Apr. 22, 2010

(30) Foreign Application Priority Data

Oct. 20, 2008 (JP) ................. 2008-269770

(51) Int. Cl.
 *H04N 5/262* (2006.01)
 *G06K 9/40* (2006.01)
(52) U.S. Cl. .................. 348/240.1; 382/275
(58) Field of Classification Search ............... 348/240.1
 See application file for complete search history.

(56) References Cited

U.S. PATENT DOCUMENTS

| 5,905,530 | A * | 5/1999 | Yokota et al. ............. 348/240.99 |
| 2006/0087562 | A1* | 4/2006 | Nakanishi et al. ....... 348/208.12 |
| 2009/0015694 | A1* | 1/2009 | Saito ........................ 348/240.99 |

FOREIGN PATENT DOCUMENTS

| JP | 06-237404 A | 8/1994 |
| JP | 2000-040152 A | 2/2000 |
| JP | 2002-010122 A | 1/2002 |
| JP | 2004-272294 A | 9/2004 |
| JP | 2005-011268 A | 1/2005 |
| JP | 2007-005912 A | 1/2007 |
| JP | 2008-186479 A | 8/2008 |

OTHER PUBLICATIONS

Office Action established for JP 2008-269770 (Jul. 24, 2012).

* cited by examiner

*Primary Examiner* — Albert Cutler
(74) *Attorney, Agent, or Firm* — Drinker Biddle & Reath LLP

(57) ABSTRACT

A photographing apparatus is provided that is capable of minimizing an access bandwidth of memory included in the photographing apparatus and is capable of reducing power consumption, and a method of controlling the photographing apparatus. The photographing apparatus includes a distortion correction unit for performing distortion correction on a captured image by performing image processing; a digital zoom unit for performing digital zoom on the captured image by performing image processing; and a host central processing unit (CPU) for controlling the photographing apparatus to perform one of the distortion correction by the distortion correction unit and the digital zoom by the digital zoom unit. A method of controlling the photographing apparatus is also provided. In addition, a recording medium having recorded thereon a computer program to implement the method is also provided.

7 Claims, 4 Drawing Sheets

PHOTOGRAPHING APPARATUS THAT PERFORMS DISTORTION CORRECTION IN ASSOCIATION WITH DIGITAL AND OPTICAL ZOOM, METHOD OF CONTROLLING THE SAME, AND RECORDING MEDIUM HAVING RECORDED THEREON COMPUTER PROGRAM TO IMPLEMENT THE METHOD

CROSS-REFERENCE TO RELATED PATENT APPLICATION

This application claims the benefit of Japanese Patent Application No. 2008-0269770, filed on Oct. 20, 2008, in the Japanese Intellectual Property Office, the entire contents of which is incorporated herein by reference.

BACKGROUND OF THE INVENTION

1. Field of the Invention

The present invention relates to a photographing apparatus, a method of controlling the same, and a recording medium having recorded thereon a computer program to implement the method. More particularly, the present invention relates to a photographing apparatus that is capable of minimizing an access bandwidth of memory included in the photographing apparatus and that is also capable of reducing power consumption, a method of controlling the photographing apparatus, and a recording medium having recorded thereon a computer program to implement the method.

2. Description of the Related Art

In current times, photographing apparatuses such as digital cameras are decreasing in size and are able to operate at a wider angle, which can increase distortion in edge regions of a captured image.

For example, Japanese Patent Publication No. 2005-011268 discloses technology for correcting distortion of images captured using a lens optical system by using a distortion correction circuit.

Meanwhile, digital zoom technology for increasing a magnification of an image obtained from an imaging device of a photographing apparatus such as a digital camera, by performing image processing on the image is well-known.

However, in the photographing apparatus, data read by the imaging device is initially stored in memory such as synchronous dynamic random access memory (SDRAM). The data is read from the SDRAM so as to undergo distortion correction, and then is re-stored in the SDRAM after the distortion correction is performed. Likewise, when digital zoom is performed, image data stored in the SDRAM is read, a magnified image is generated by performing image processing such as interpolation on the image data, and then the magnified image is re-stored in the SDRAM.

As such, data read and write operations from/into memory are frequently performed and thus a bandwidth for accessing the memory becomes insufficient. In particular, the distortion correction and the digital zoom are performed on uncompressed image data. As a result, an accessing bandwidth of memory becomes greatly insufficient. Also, in a small device, an access bandwidth of SDRAM is originally small and thus ensuring a sufficient access bandwidth becomes more difficult. Accordingly, a solution of, for example, operating a system clock at high speed is required and thus system configuration becomes complicated and power consumption is increased.

Also, photographing apparatuses such as digital cameras require higher speed processing in order to comply with high-vision video images and high-resolution display devices. In this situation, photographing apparatuses such as portable devices cannot easily increase a total frequency bandwidth of memory because an available frequency bandwidth of memory is limited and a bandwidth of a bus cannot be increased in consideration of manufacturing costs, and thus an access bandwidth of memory becomes greatly insufficient.

SUMMARY OF THE INVENTION

The present invention provides a new and improved photographing apparatus capable of minimizing an access bandwidth of memory included in the photographing apparatus and capable of reducing power consumption, a method of controlling the photographing apparatus, and a recording medium having recorded thereon a computer program to implement the method.

According to an embodiment of the present invention, a photographing apparatus is provided. The photographing apparatus includes a distortion correction unit for performing distortion correction on a captured image by performing image processing; a digital zoom unit for performing digital zoom on the captured image by performing image processing; and a control unit for controlling the photographing apparatus to perform one of the distortion correction by the distortion correction unit and the digital zoom by the digital zoom unit. As such, because only one of the distortion correction by the distortion correction unit and the digital zoom by the zoom unit is performed, an access bandwidth of memory included in the photographing apparatus may be minimized and thus power consumption may be reduced.

The photographing apparatus may further include a lens optical system having a variable focal length, wherein, if the captured image is to be further magnified when the focal length of the lens optical system reaches a tele-end, the digital zoom unit performs the digital zoom on the captured image, and if the focal length of the lens optical system is closer to a wide-end than the tele-end, the distortion correction unit performs the distortion correction on the captured image. As such, because the digital zoom by the zoom unit is performed to further magnify the captured image at the tele-end and the distortion correction by the distortion correction unit is performed at the wide-end far from the tele-end, an access bandwidth of memory included in the photographing apparatus may be minimized and thus power consumption may be reduced.

The distortion correction unit may reduce an amount of the distortion correction as the focal length of the lens optical system gets closer to the tele-end and farther from the wide-end, based on a control value obtained from a distortion correction amount table. As such, because distortion gradually increase as the focal length gets closer to the tele-end, the distortion does not rapidly increase near the tele-end and thus a user may not experience incongruity.

The distortion correction unit may make the amount of the distortion correction approach zero as the focal length of the lens optical system gets closer to the tele-end. As such, great distortion may not be recognized by a user when the focal length reaches the tele-end far from the wide-end.

The distortion correction unit may make the amount of the distortion correction approach zero as the focal length of the lens optical system gets closer to the tele-end if the digital zoom by the digital zoom unit is approved, and may not make the amount of the distortion correction approach zero if the digital zoom by the digital zoom unit is not approved. As such, because great distortion may not be recognized by a user when the focal length reaches the tele-end only if the digital zoom by the digital zoom unit is approved and the captured image is further magnified at the tele-end, and thus a user may not experience incongruity.

According to another embodiment of the present invention, a method of controlling a photographing apparatus is provided. The method includes performing distortion correction on a captured image by performing image processing within a range of a variable focal length of a lens optical system; determining whether the focal length of the lens optical system reaches a tele-end; and if the captured image is to be further magnified after the focal length of the lens optical system reaches the tele-end, performing digital zoom on the captured image by performing image processing and terminating the distortion correction performed on the captured image. As such, because only one of the distortion correction by the distortion correction unit and the digital zoom by the zoom unit is performed, an access bandwidth of memory included in the photographing apparatus may be minimized and thus power consumption may be reduced.

The performing of the distortion correction may include reducing an amount of the distortion correction as the focal length of the lens optical system gets closer to the tele-end and farther from the wide-end, based on a control value obtained from a distortion correction amount table. As such, because distortion gradually increases as the focal length gets closer to the tele-end, the distortion does not rapidly increase near the tele-end and thus a user may not experience incongruity.

The performing of the distortion correction may include making the amount of the distortion correction approach zero as the focal length of the lens optical system gets closer to the tele-end. As such, great distortion may not be recognized by a user when the focal length reaches the tele-end far from the wide-end.

According to another embodiment of the present invention, a computer readable recording medium is provided. The computer readable recording medium has recorded thereon a computer program for executing the method described previously.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
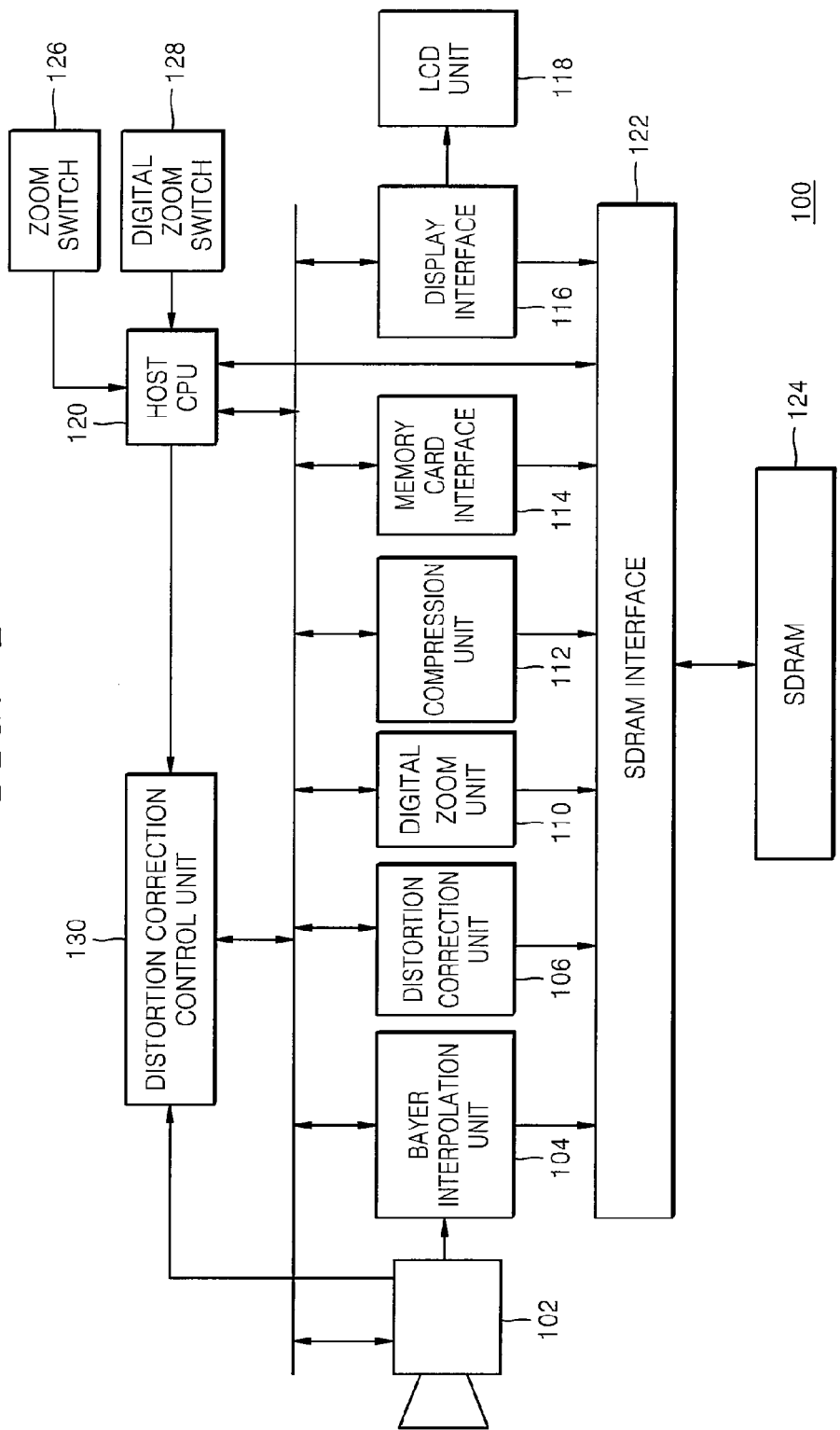
FIG. 1 is a block diagram of an example of a photographing apparatus according to an embodiment of the present invention.

Hereinafter, the present invention will be described in detail by explaining embodiments of the invention with reference to the attached drawings. Like reference numerals denote like elements in the drawings and repeated descriptions will be omitted.

FIG. 1 is a block diagram of an example of a photographing apparatus 100 according to an embodiment of the present invention.

Referring to FIG. 1, the photographing apparatus 100 includes a camera unit 102, a Bayer interpolation unit 104, a distortion correction unit 106, a distortion correction control unit 130, a digital zoom unit 110, a compression unit 112, a memory card interface 114, a display interface 116, a liquid crystal display (LCD) unit 118, a host central processing unit (CPU) 120, a synchronous dynamic random access memory (SDRAM) interface 122, a SDRAM 124, a zoom switch 126, and a digital zoom switch 128.

The camera unit 102 in the example of FIG. 1 includes a lens optical system and an imaging device. In the current embodiment, the lens optical system has an optical zoom function for varying a focal length based on movement of a group of lenses. The imaging device includes a sensor such as, for example, a charge coupled device (CCD) or a complementary metal oxide semiconductor (CMOS).

In the camera unit 102, an image of a subject is formed on an imaging surface of the imaging device by the lens optical system and an image signal is obtained by the imaging device. The image signal is output from the imaging device in the form of a Bayer pattern and is converted into a YCbCr signal by the Bayer interpolation unit 104. The YCbCr signal converted by the Bayer interpolation unit 104 is transmitted to the SDRAM 124 through the SDRAM interface 122 and is initially stored in the SDRAM 124. In addition to Bayer interpolation for converting input data into a YCbCr signal, the Bayer interpolation unit 104 performs a series of processes such as white balance adjustment, noise removal, and luminance and color correction. The distortion correction unit 106 reads the image data stored in the SDRAM 124 and corrects distortion of the image data. As such, an image without distortion may be obtained. The image data of which distortion is corrected is transmitted to the SDRAM 124 through the SDRAM interface 122 and is stored in the SDRAM 124.

The distortion correction control unit 130 outputs a control value for controlling the amount of distortion correction according to the focal length of the lens optical system of the camera unit 102, which will be described later in detail. The distortion correction unit 106 reads the image data converted by the Bayer interpolation unit 104 from the SDRAM 124 and corrects the distortion of the image data based on the control value determined by the distortion correction control unit 130.

The zoom switch 126 outputs a signal for changing locations of the lenses included in the lens optical system according to manipulation by a user. The host CPU 120 drives the lens optical system to perform zooming, based on the signal.

The digital zoom switch 128 transmits a signal for representing approval or disapproval of digital zoom to the host CPU 120, according to manipulation by the user. The host CPU 120 controls the distortion correction control unit 130 based on the signal for representing approval or disapproval of the digital zoom.

The digital zoom unit 110 generates a magnified image by using a digital zoom function. The digital zoom unit 110 reads the image data stored in the SDRAM 124 and generates the magnified image by interpolating the image data. The digital zoom function of the digital zoom unit 110 is performed when the digital zoom is approved due to manipulation of the digital zoom switch 128, and when manipulation of the zoom switch 126 instructs to magnify an image at a tele-end of optical zoom. As such, the image may be further magnified to exceed the tele-end of the optical zoom.

The magnified image generated by the digital zoom unit 110 is re-stored in the SDRAM 124. The compression unit 112 reads the image data stored in the SDRAM 124 and compresses the image data into, for example, a Joint Photographic Experts Group (JPEG) format or a Moving Picture Experts Group (MPEG) format. The compressed image data is stored in the SDRAM 124.

The host CPU 120 controls operation of each element illustrated in FIG. 1. The LCD unit 118 is connected to an LCD interface 116 and displays, for example, a captured image. The SDRAM interface 122 is used to store data in the SDRAM 124.

The above-described photographing apparatus 100 is controlled, for example, to perform only one of the digital zoom by the digital zoom unit 110 and the distortion correction by the distortion correction unit 106. In more detail, if an image is to be further magnified by performing the digital zoom at the tele-end of the optical zoom, the image is magnified by performing the digital zoom without performing the distortion correction. On the other hand, in a range from a wide-end to the tele-end of the optical zoom, the distortion correction is performed without performing the digital zoom.

As such, frequency of accessing the SDRAM 124 may be reduced and thus exceeding of a bandwidth of the SDRAM 124 may be prevented. Accordingly, power consumption may be greatly reduced. Also, fast operation may not be required, a system clock speed may be minimized, a simple structure may be realized, and thus costs may be reduced.

In general, distortion of an image at the tele-end of the optical zoom is less than that at the wide-end of the optical zoom. Thus, when the digital zoom is further performed at the tele-end of the optical zoom, although the distortion correction is not performed, the distortion may be minimized.

As such, when the image is to be further magnified at the tele-end of the optical zoom, the bandwidth of the SDRAM 124 may be ensured by performing the digital zoom without performing the distortion correction and thus the power consumption may be reduced. On the other hand, if the distortion correction by the distortion correction unit 106 is performed until the optical zoom reaches the tele-end and the distortion correction is not performed from when the digital zoom is performed at the tele-end, distortion of an image may occur when the optical zoom is switched to the digital zoom at the tele-end and thus the user may experience visual incongruity. Thus, in the above embodiment, if the digital zoom is approved due to manipulation of the digital zoom switch 128, the amount of the distortion correction is controlled to be reduced as the focal length gets closer to the tele-end due to a magnification operation of the optical zoom and to be zero at the tele-end of the optical zoom.

Figure 2:
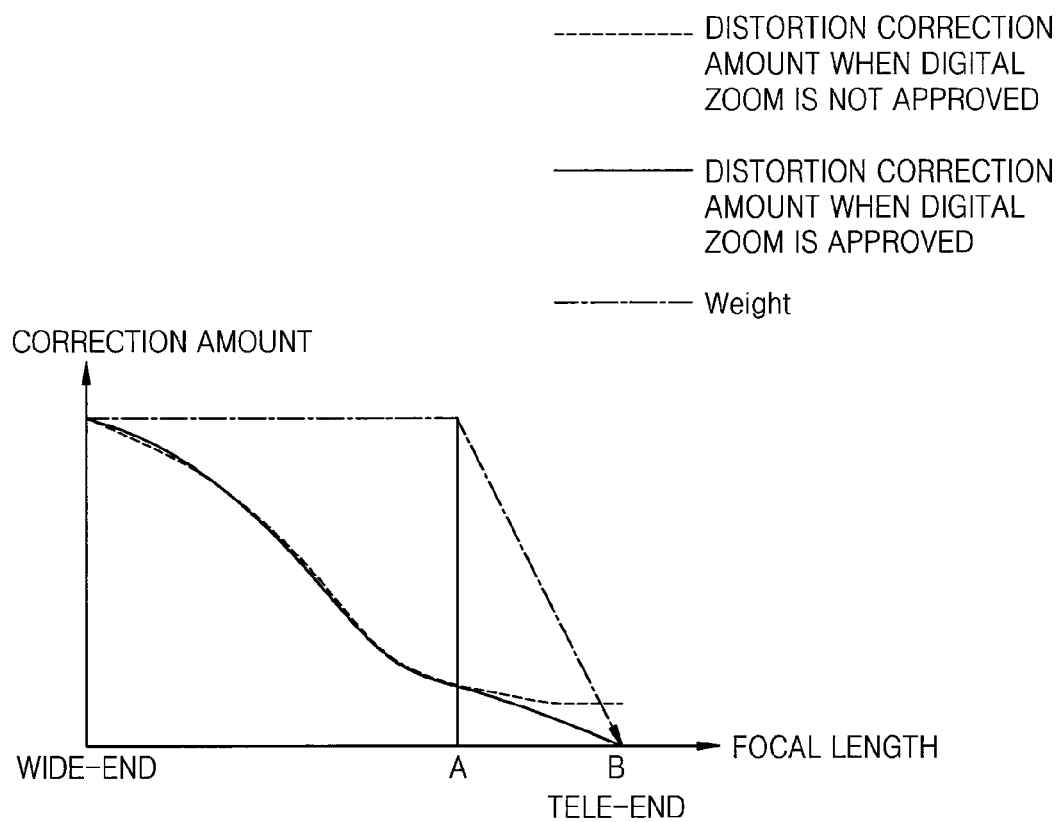
FIG. 2 is a graph illustrating examples of correlations between a focal length of optical zoom and the amount of distortion correction performed by a distortion correction unit.

FIG. 2 is a graph illustrating examples of correlations between a focal length of optical zoom and the amount of distortion correction performed by the distortion correction unit 106 illustrated in the example of FIG. 1.

Referring to the examples of FIG. 2, a dotted line represents a case when digital zoom is not used and a solid line represents a case when the digital zoom is used.

In general, distortion of a captured image increases as the focal length gets closer to a wide-end. Thus, as illustrated in FIG. 2, the amount of the distortion correction is set to be large as the focal length gets closer to the wide-end and is set to be small as the focal length gets closer to a tele-end. If the digital zoom is not used, as illustrated by the dotted line, the amount of the distortion correction is greater than zero in the entire range of the optical zoom from the wide-end to the tele-end, and thus the distortion correction is performed on the entire range of the optical zoom.

On the other hand, if the digital zoom is performed, the dotted line is multiplied by a weight represented by a dashed-dotted line. As such, the amount of the distortion correction becomes as that represented by the dotted line. Accordingly, the amount of the distortion correction in a region adjacent to the tele-end is smaller than that represented by the dotted line and thus the amount of the distortion correction at the tele-end becomes zero. As such, the distortion correction is not performed at the tele-end of the optical zoom and thus a large amount of distortion that occurs when the optical zoom is switched to the digital zoom at the tele-end if the distortion correction is not performed in a region of the digital zoom, may be prevented. Accordingly, a user may not experience visual incongruity.

Figure 3:
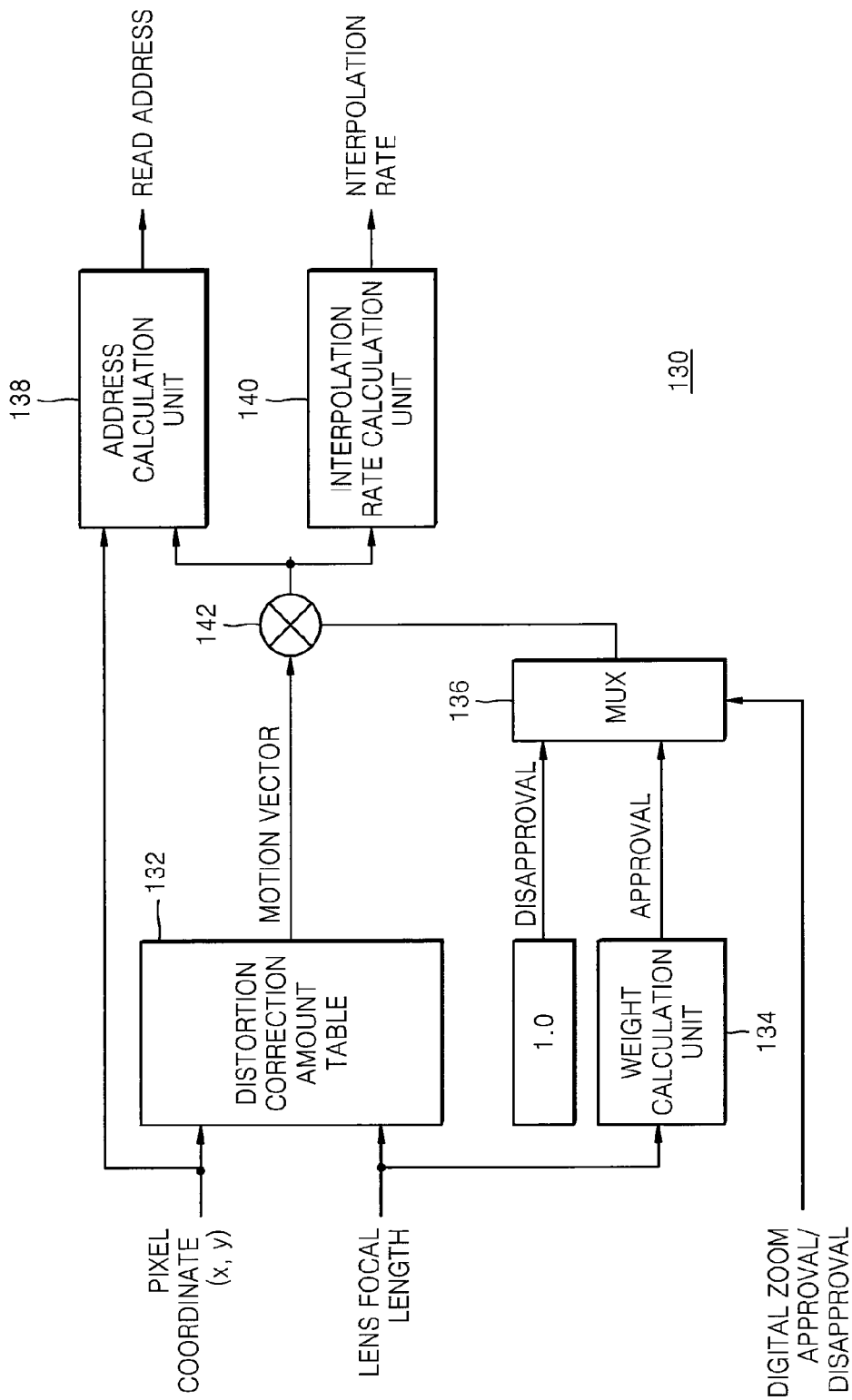
FIG. 3 is a block diagram of an example of a distortion correction control unit according to an embodiment of the present invention.

FIG. 3 is a block diagram of an example of the distortion correction control unit 130 illustrated in the example of FIG. 1, according to an embodiment of the present invention. FIG. 3 will be described in conjunction with the example of FIG. 1.

Referring to the example of FIG. 3, the distortion correction control unit 130 includes a distortion correction amount table 132, a weight calculation unit 134, a multiplexer (MUX) 136, an address calculation unit 138, an interpolation rate calculation unit 140, and a multiplication unit 142.

The distortion correction control unit 130 receives a pixel coordinate (x,y) from the distortion correction unit 106, and receives a focal length of a lens optical system of the camera unit 102. The focal length of the lens optical system is obtained from the location of a lens of a magnification optical system. The pixel coordinate (x,y) and the focal length of the lens optical system are input to the distortion correction amount table 132. The focal length of the lens optical system is also input to the weight calculation unit 134.

In the distortion correction amount table 132, the pixel coordinate (x,y) and the focal length of the lens optical system correspond to a distortion correction motion vector. The distortion correction amount table 132 calculates a motion vector based on the pixel coordinate (x,y) and the focal length and outputs the motion vector to the multiplication unit 142.

The weight calculation unit 134 stores a table corresponding to the dashed-dotted line illustrated in FIG. 2. When the focal length is input, the weight calculation unit 134 calculates a weight based on the dashed-dotted line illustrated in FIG. 2 and outputs the weight to the MUX 136. Also, a fixed value (=1.0) of the weight is input to the MUX 136.

The MUX 136 receives information representing approval or disapproval of digital zoom according to manipulation of the digital zoom switch 128. If the digital zoom switch 128 is turned on, the information representing approval of the digital zoom is input to the MUX 136. If the digital zoom switch 128 is turned off, the information representing disapproval of the digital zoom is input to the MUX 136.

If the information representing approval of the digital zoom is input, the MUX 136 outputs the weight input from the weight calculation unit 134 to the multiplication unit 142. Meanwhile, if the information representing disapproval of the digital zoom is input, the MUX 136 outputs the fixed value (=1.0) of the weight to the multiplication unit 142.

The multiplication unit 142 multiplies the motion vector input from the distortion correction amount table 132 by the weight input from the MUX 136, and outputs the multiplied result to the address calculation unit 138 and the interpolation rate calculation unit 140.

The pixel coordinate (x,y) is also input to the address calculation unit 138. The address calculation unit 138 calculates a read address by using the pixel coordinate (x,y) and the motion vector. The interpolation rate calculation unit 140 calculates an interpolation rate by using the motion vector. In more detail, the read address is determined based on the motion vector corresponding to the pixel coordinate (x,y). The read address includes a plurality of addresses for generating a signal of the pixel coordinate (x,y). In most cases, four addresses (pixel coordinates) on an imaging device are designated. The interpolation rate is used to generate the signal of the pixel coordinate (x,y) by using the read address formed of the plurality of addresses and is determined according to the motion vector.

Thus, the signal of the pixel coordinate (x,y) may be determined by using the read address and the interpolation rate. The read address and the interpolation rate are input to the distortion correction unit 106 and are used to perform distortion correction. Image data on which the distortion correction is performed is transmitted to and stored in the SDRAM 124.

The motion vector is two-dimensional but is represented one-dimensionally in the examples of FIGS. 2 and 3 for convenience of explanation.

As described above, if the digital zoom is not approved, the fixed value (=1.0) of the weight is input from the MUX 136 to the multiplication unit 142 and thus the motion vector output from the distortion correction amount table 132 is not corrected. Thus, the read address and the interpolation rate are calculated by using the uncorrected motion vector and are input to the distortion correction unit 106. As such, as illustrated by the dotted line illustrated in FIG. 2, the distortion correction may be performed on an entire range from a wide-end to a tele-end of optical zoom.

On the other hand, if the digital zoom is approved, according to the focal length, the weight represented by the dashed-dotted line illustrated in FIG. 2 is output from the weight calculation unit 134 and is multiplied by the motion vector output from the distortion correction amount table 132. Thus, the read address and the interpolation rate are calculated by using the corrected motion vector and are input to the distortion correction unit 106. As such, the amount of the distortion correction may be controlled as illustrated by the solid line illustrated in FIG. 2, and the amount of the distortion correction may decrease to zero as the focal length gets closer to the tele-end. Thus, the optical zoom may be switched to the digital zoom without visual incongruity and the distortion correction at the wide-end may be realized.

Also, the distortion correction control unit 130 may have a structure other than the structure illustrated in the example of FIG. 3. For example, the distortion correction amount table 132 may store two tables corresponding to the solid and dotted lines illustrated in FIG. 2. In this case, based on a signal representing approval or disapproval of the digital zoom, the distortion correction amount table 132 selects the table corresponding to the solid line if the digital zoom is approved and selects the table corresponding to the dotted line if the digital zoom is not approved. As such, by switching software of the distortion correction amount table 132 according to approval/disapproval of the digital zoom, the weight calculation unit 134 may not be included and thus the structure may be simplified.

Figure 4:
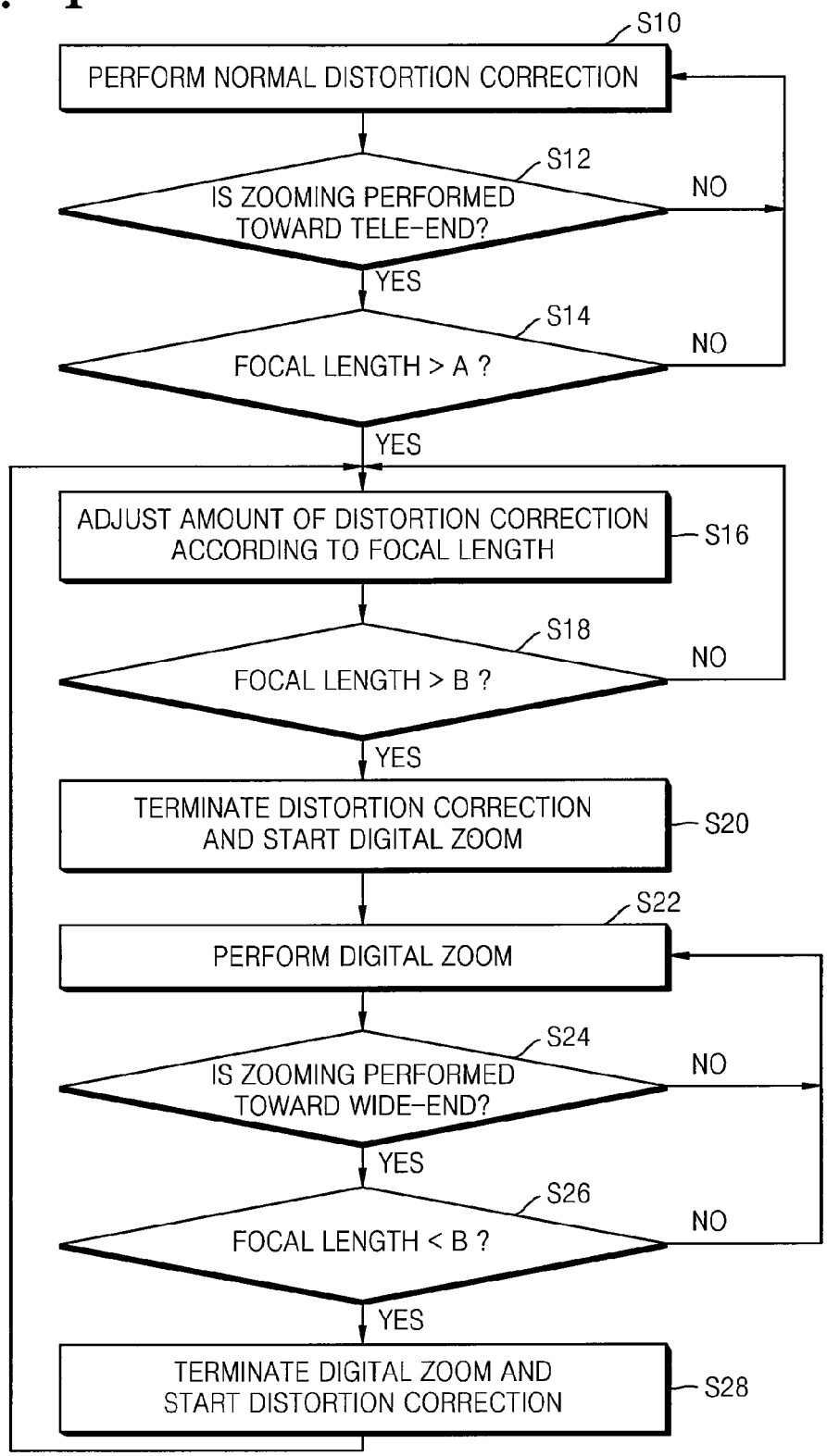
FIG. 4 is a flowchart illustrating an example of a method of controlling a photographing apparatus, according to an embodiment of the present invention.

FIG. 4 is a flowchart illustrating an example of a method of controlling the photographing apparatus 100 illustrated in the example of FIG. 1, according to an embodiment of the present invention. FIG. 4 illustrates an example of a case when digital zoom is approved and will be described in conjunction with the example of FIG. 1.

Referring to the example of FIG. 4, initially, in operation S10, a focal length is equal to or less than a value A illustrated in FIG. 2 and normal distortion correction is performed. In operation S12, it is determined whether zooming is performed toward a tele-end. If the zooming is performed toward the tele-end, the method proceeds to operation S14. On the other hand, if the zooming is not performed toward the tele-end, the method returns to operation S10.

In operation S14, it is determined whether the focal length exceeds the value A. If the focal length exceeds the value A, the method proceeds to operation S16. On the other hand, if the focal length does not exceed the value A, the method returns to operation S10. In operation S16, the distortion correction control unit 130 adjusts the amount of distortion correction according to the focal length.

In operation S18, it is determined whether the focal length exceeds a value B illustrated in FIG. 2, that is, whether the focal length reaches the tele-end and exceeds the tele-end. If the focal length exceeds the value B, in operation S20, the distortion correction is terminated and the digital zoom unit 110 starts digital zoom. On the other hand, if the focal length does not exceed the value B in operation S18, the method returns to operation S16.

After operation S20 is performed, the method proceeds to operation S22. In operation S22, an image is magnified or reduced by performing the digital zoom according to manipulation of the zoom switch 126. In operation S24, it is determined whether the zooming is performed toward a wide-end. If the zooming is performed toward the wide-end wide, the method proceeds to operation S26. On the other hand, if the zooming is not performed toward the wide-end, the method returns to operation S22.

In operation S26, it is determined whether the focal length becomes less than the value B. If the focal length is less than the value B, the method proceeds to operation S28. In operation S28, the digital zoom by the digital zoom unit 110 is terminated and the distortion correction by the distortion correction unit 106 and the distortion correction control unit 130 is started. After operation S28 is performed, the method returns to operation S16. Meanwhile, if the focal length is equal to or greater than the value B in operation S26, the method returns to operation S22.

According to the method illustrated in the example of FIG. 4, if the focal length exceeds the value B, the distortion correction is terminated and the digital zoom is started and thus the distortion correction and the digital zoom are not performed together. Accordingly, a bandwidth of the SDRAM 124 may be ensured and power consumption may be reduced.

Also, if the focal length exceeds the value A, the amount of the distortion correction is adjusted according to the focal length and thus, as represented by the solid line illustrated in FIG. 2, the amount of the distortion correction may be controlled to become zero as the focal length gets closer to the tele-end. Accordingly, if the distortion correction is terminated when the focal length reaches the value B, recognition of image distortion by a user may be definitely reduced.

Meanwhile, the invention can also be embodied as computer readable codes on a computer readable recording medium. The computer readable recording medium is any data storage device that can store data which can be thereafter read by a computer system.

Examples of the computer readable recording medium include read-only memory (ROM), random-access memory (RAM), CD-ROMs, magnetic tapes, floppy disks, optical data storage devices, and the like. The computer readable recording medium can also be distributed over network coupled computer systems so that the computer readable code is stored and executed in a distributed fashion. Also, functional programs, codes, and code segments for accomplishing the present invention can be easily construed by programmers of ordinary skill in the art to which the present invention pertains.

As described above, according to the present invention, an access bandwidth of memory included in a photographing apparatus may be minimized and thus power consumption may be reduced.

While the present invention has been particularly shown and described with reference to exemplary embodiments thereof, it will be understood by one of ordinary skill in the art that various changes in form and details may be made therein without departing from the spirit and scope of the invention as defined by the following claims. The exemplary embodiments should be considered in descriptive sense only and not for purposes of limitation. Therefore, the scope of the invention is defined not by the detailed description of the invention but by the following claims, and all differences within the scope will be construed as being included in the present invention.

What is claimed is:

1. A photographing apparatus comprising:
   a distortion correction unit configured to perform distortion correction on a captured image by performing image processing;
   a digital zoom unit configured to perform digital zoom on the captured image by performing image processing;
   a control unit configured to control the photographing apparatus to perform one of the distortion correction by the distortion correction unit and the digital zoom by the digital zoom unit; and
   a lens optical system having a variable focal length;
   wherein:
      if the captured image is to be further magnified when the focal length of the lens optical system reaches a tele-end, then the control unit controls to perform the digital zoom by the digital zoom unit and not to perform the distortion correction by the distortion correction unit; and
      the distortion correction unit makes the amount of the distortion correction approach zero as the focal length of the lens optical system gets closer to the tele-end if the digital zoom by the digital zoom unit is approved and does not make the amount of the distortion correction approach zero if the digital zoom by the digital zoom unit is not approved.

2. The photographing apparatus of claim 1, wherein, if the captured image is to be further magnified when the focal length of the lens optical system reaches a tele-end, the digital zoom unit performs the digital zoom on the captured image, and if the focal length of the lens optical system is closer to a wide-end than the tele-end, the distortion correction unit performs the distortion correction on the captured image.

3. The photographing apparatus of claim 2, wherein the distortion correction unit reduces an amount of the distortion correction as the focal length of the lens optical system gets closer to the tele-end and farther from the wide-end, based on a control value obtained from a distortion correction amount table.

4. A photographing apparatus comprising:
   a distortion correction unit configured to perform distortion correction on a captured image by performing image processing;
   a digital zoom unit configured to perform digital zoom on the captured image by performing image processing;
   a control unit configured to control the photographing apparatus to perform one of the distortion correction by the distortion correction unit and the digital zoom by the digital zoom unit, and
   a lens optical system having a variable focal length, wherein
   if the captured image is to be further magnified when the focal length of the lens optical system reaches a tele-end, the digital zoom unit performs the digital zoom on the captured image, and if the focal length of the lens optical system is closer to a wide-end than the tele-end, the distortion correction unit performs the distortion correction on the captured image;
   the distortion correction unit reduces an amount of the distortion correction as the focal length of the lens optical system gets closer to the tele-end and farther from the wide-end, based on a control value obtained from a distortion correction amount table; and
   the distortion correction unit makes the amount of the distortion correction approach zero as the focal length of the lens optical system gets closer to the tele-end if the digital zoom by the digital zoom unit is approved, and does not make the amount of the distortion correction approach zero if the digital zoom by the digital zoom unit is not approved.

5. A method of controlling a photographing apparatus, the method comprising:
   performing distortion correction on a captured image by performing image processing within a range of a variable focal length of a lens optical system;
   determining whether the focal length of the lens optical system reaches a tele-end; and
   if the captured image is to be further magnified after the focal length of the lens optical system reaches the tele-end, performing digital zoom on the captured image by performing image processing and terminating the distortion correction performed on the captured image,
   wherein the performing of the distortion correction comprises:
      reducing an amount of the distortion correction as the focal length of the lens optical system gets closer to the tele-end and farther from the wide-end, based on a control value obtained from a distortion correction amount table, and
      making the amount of the distortion correction approach zero as the focal length of the lens optical system gets closer to the tele-end if the digital zoom by the digital zoom unit is approved, and does not make the amount of the distortion correction approach zero if the digital zoom by the digital zoom unit is not approved.

6. A non-transitory computer readable recording medium having recorded thereon a computer program for executing a method of controlling a photographing apparatus, the method comprising:
   performing distortion correction on a captured image by performing image processing within a range of a variable focal length of a lens optical system;
   determining whether the focal length of the lens optical system reaches a tele-end; and
   if the captured image is to be further magnified after the focal length of the lens optical system reaches the tele-end, performing digital zoom on the captured image by performing image processing and terminating the distortion correction performed on the captured image,
   wherein in the method performing of the distortion correction comprises:

reducing an amount of the distortion correction as the focal length of the lens optical system gets closer to the tele-end and farther from the wide-end, based on a control value obtained from a distortion correction amount table, and making the amount of the distortion correction approach zero as the focal length of the lens optical system gets closer to the tele-end if the digital zoom by the digital zoom unit is approved, and does not make the amount of the distortion correction approach zero if the digital zoom by the digital zoom unit is not approved.

7. A method of controlling a photographing apparatus, the method comprising:

performing distortion correction on a captured image by performing image processing within a range of a variable focal length of a lens optical system;

determining whether the focal length of the lens optical system reaches a tele-end; and if the captured image is to be further magnified after the focal length of the lens optical system reaches the tele-end, performing digital zoom on the captured image by performing image processing and terminating the distortion correction performed on the captured image, wherein:

the amount of the distortion correction approaches zero as the focal length of the lens optical system gets closer to the tele-end if the digital zoom is approved, and the amount of the distortion correction does not approach zero if the digital zoom is not approved.

* * * * *